United States Patent [19]

Glass

[11] 4,017,163
[45] Apr. 12, 1977

[54] ANGLE AMPLIFYING OPTICS USING PLANE AND ELLIPSOIDAL REFLECTORS

[75] Inventor: Alexander J. Glass, Pleasanton, Calif.

[73] Assignee: The United States of America as represented by the United States Energy Research and Development Administration, Washington, D.C.

[22] Filed: Apr. 16, 1976

[21] Appl. No.: 677,646

[52] U.S. Cl. .................................. 350/294; 350/55
[51] Int. Cl.² ..................... G02B 5/10; G02B 17/00
[58] Field of Search ............ 350/294, 299, 199, 55, 350/296

[56] References Cited
OTHER PUBLICATIONS

Thomas, "Optics for Laser Fusion", *Laser Focus;* Adv. Tech. Pub., Inc., June 1975, pp. 49–51.

*Primary Examiner*—Paul A. Sacher
*Assistant Examiner*—Jon W. Henry
*Attorney, Agent, or Firm*—Dean E. Carlson; Roger S. Gaither; L. E. Carnahan

[57] ABSTRACT

An optical system for providing a wide angle input beam into ellipsoidal laser fusion target illumination systems. The optical system comprises one or more pairs of centrally apertured plane and ellipsoidal mirrors disposed to accept the light input from a conventional lens of modest focal length and thickness, to increase the angular divergence thereof to a value equivalent to that of fast lenses, and to direct the light into the ellipsoidal target illumination system.

5 Claims, 6 Drawing Figures

ANGLE AMPLIFYING OPTICS USING PLANE AND ELLIPSOIDAL REFLECTORS

BACKGROUND OF THE INVENTION:

The invention described herein was made in the course of, or under, Contract No. W-7405-ENG-48, with the Energy Research and Development Administration.

This invention relates to angle amplifying optics, and more particularly to angle amplifying optics for providing wide angle input beams into ellipsoidal laser fusion target illumination systems.

Multiple-beam laser systems, such as those using two opposed laser beams, are being utilized for conducting laser fusion experiments wherein a very tiny fusion fuel target is imploded by laser energy causing thermonuclear burn thereof. An important aspect of these experimental facilities relates to the target chamber optics for uniformly distributing the light from the multiple beams over the surface of the targets. Thus, substantial effort has been directed to the optics systems for the target chambers.

By way of example of the prior efforts directed to optics systems for laser fusion applications, copending U.S. patent application Ser. No. 561,719 filed Mar. 25, 1975 in the name of Claude R. Phipps et al. and assigned to the assignee of this application, describes and claims the socalled "clamshell" illuminator, which comprises a pair of opposed ellipsoidal reflectors of 1/3 eccentricity, disposed with one of their foci coinciding and the respective other foci in axial alignment and coinciding with the center of small apertures in the apex of each of those ellipsoidal reflectors. Two approaches, refractive and reflective, for introducing light into the clamshell illuminator through the apex apertures are involved in the above-referenced optics system, with there being problems with both approaches.

In the case of using refractive optics, for example, previous approaches called for a fast lens for providing an input beam of sufficiently wide angular divergence into the ellipsoidal clamshell reflectors and to uniformly distributing light over the entire target surface. The problem here is that such lenses are necessarily very thick, which introduces an undesirable amount of glass into the optical path, with attendant nonlinear distortion of the beam. Thus, a need exists in the prior art efforts for an optics system involving refractive optics which eliminates this problem.

SUMMARY OF THE INVENTION

The present invention is directed to an optical system which solves the above-mentioned problem regarding the use of refractive optics in that it requires only relatively thin lenses of modest focal lengths. The necessary angular divergence of the beam is obtained by the use of plane and ellipsoidal pairs disposed between the lens and the clamshell reflectors, such that the angular divergence is increased to a value equivalent to that of fast lenses, and thus the laser light is directed into the ellipsoidal target illumination system.

Therefore, it is an object of the invention to provide angle amplifying optics.

A further object of the invention is to provide an optical system for providing a wide angle input beam into ellipsoidal target illumination systems.

Another object of the invention is to provide an ellipsoidal target illumination system using refractive optics which requires only relatively thin lenses of modest focal lengths.

Another object of the invention is to provide an optical system for providing a wide angle input beam into ellipsoidal target illumination systems wherein the necessary angular divergence of the beam is obtained by use of plane and ellipsoidal mirror pairs.

Other objects of the invention will become readily apparent from the following description and accompanying drawings.

DESCRIPTION OF THE INVENTION

The invention is directed to an optical system for providing a wide angle input beam into ellipsoidal target illumination systems, such as laser-fusion target chambers. Basically, the optical system comprises one or more pairs of centrally apertured plane and ellipsoidal mirrors disposed to accept the light input from a conventional lens of modest focal length and thickness, to increase the angular divergence thereof to a value equivalent to that of fast lenses, and to direct the light into said ellipsoidal target illumination system.

Figure 1:
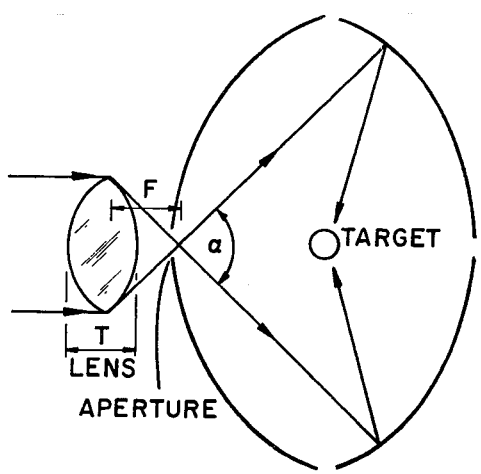
FIG. 1 schematically illustrates the prior art clamshell target chamber using the fast lens, one lens being omitted for clarity.

As pointed out above, combinations of reflecting and refracting optics have been used to provide wide-angle illumination of laser fusion targets. A particularly simple configuration of the prior known optics systems for multi-beam applications is shown in FIG. 1, with only one side being shown for clarity, and consists of a low f-number lens and an ellipsoidal reflecting cavity or clamshell forming a fusion target chamber. The ellipsoid in designed so that, along the optical axis, the interfocal distance equals the distance from the focus to the nearest reflecting surface, i.e., the eccentricity is one-third.

In the prior art arrangement shown in FIG. 1, a lens (only one shown) is positioned on opposite sides of the clamshell target chamber composed of a pair of centrally apertured ellipsoidal reflecting members such that the focal point of each lens is at the central aperture of the adjacent ellipsoidal member, the chamber or cavity formed by the reflecting members containing a centrally located fusion target to be illuminated and imploded by laser light energy directed via the lens into the target chamber.

In order to obtain the required uniformity of illumination at the focus of the ellipsoids, the half-angle at the focus of the lens, identified as angle $\alpha$ in FIG. 1, must be approximately 46.6°. Thus the marginal ray, which just touches the apex of the lens, will make an angle of about 50° at the axis. The difference in path between the marginal ray at radius R and a ray propagating the air along the axis is given by $$\delta S = (R^2+F^2)^{1/2} - F = R(1 - \cos\theta)/\sin\theta = R\tan\theta/2. \quad (1)$$

where $F$ is the focal length of the lens, and $\tan\theta = R/F$. This path difference must be equal to $(n-1)T$, where $T$ is the lens thickness, and $n$ the refractive index of the lens. Thus the lens thickness is given by $$T = R\tan(\theta/2)/(n-1) \quad (2)$$

For $\theta = 50°$, and $n = 1.56$, $T = 0.83 R$. In general, in this design, the lens thickness will be roughly equal to its radius.

The index nonlinearity of optical glasses is about 1.5 to $2.0 \times 10^{-13}$ esu. This corresponds to a nonlinear index change of 5 ppm at $10^{10}$ watts/cm$^2$. In a 5 cm thick lens, this corresponds to 0.25 $\mu$m index change, or one-fourth wave at 1.06 $\mu$m. This is about the maximum tolerable nonlinear distortion. The problem then arises of how to obtain large angle focusing in large aperture systems without introducing large amounts of glass into the beam.

It is this problem that is solved by the present invention as illustrated in FIGS. 2–6 and the following description, since distortion due to nonlinear phenomena renders the prior known optics, as exemplified by FIG. 1, marginal for laser fusion applications. It should be borne in mind that in each of the FIGS. 2–4 embodiments, only one side of the optical system is shown, while in actual practice with a two beam system the plane and ellipsoidal mirrors constitute pairs, one of each pair being on opposite sides of the clamshell target chamber, as readily seen in the FIGS. 5 and 6 embodiments.

Figure 2:
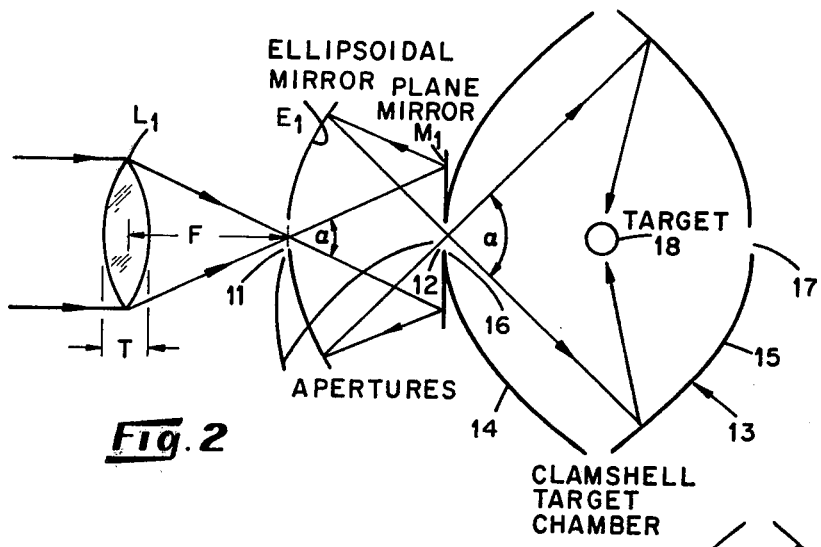
FIGS. 2 and 3 schematically illustrate embodiments in accordance with the invention utilizing thin lens and plane and ellipsoidal mirror pairs disposed between the lens and clamshell reflectors, only one side being illustrated for clarity.

FIG. 2 illustrates the concept for circumventing the above-described problem. A light beam, indicated at 10, from a source such as a laser system, not shown, is focused using a moderately low $f$-number lens assembly, $L_1$, through a small hole or aperture 11 in a partial ellipsoidal mirror or reflector, $E_1$, positioned at the focal point of lens $L_1$. Ellipsoidal mirror $E_1$, with eccentricity 1/3, is placed with a plane mirror, $M_1$, at its first focus. Plane mirror $M_1$ is provided with an aperture or opening 12 and positioned adjacent clamshell target chamber generally indicated at 13 and composed of a pair of ellipsoidal reflectors 14 and 15 having apertures 16 and 17, respectively, and within which a target 18 is positioned. Plane mirror $M_1$ is positioned such that the aperture 12 thereof aligns with aperture 16 in ellipsoidal reflector 14, with mirror $E_1$ being spaced from mirror $M_1$ such that the focal point of mirror $E_1$ is at aperture 16 in reflector 14. As indicated by the arrows in FIG. 2, light beam 10 passes through lens $L_1$, aperture 11 in mirror $E_1$ whereupon it is folded back by mirror $M_1$, refocused by mirror $E_1$ through apertures 12 and 16 in mirror $M_1$ and reflector 14, respectively, and is reflected by reflector 15 onto target 18 within cavity or chamber 13. Due to the geometry of the ellipsoidal mirror $E_1$, the focal angle of the lens is only one-half that required to introduce the light into the ellipsoidal target chamber 13. Thus, if $\alpha = 46.6°$, as before described, the focal angle ($\alpha$) of lens $L_1$ is only 23.3°. Allowing for a boundary region, to facilitate mechanical mounting of the lens, a boundary angle of 25° is provided. By the formulas and values given above, the thickness of such lens will only need to be $T = 0.40 R$. Thus the lens thickness will be diminished by more than a factor of 2, for the same beam radius and final focal angle $\alpha$.

It is thus seen that to illuminate a target located in the clamshell target chamber laser beams are passed through conventional lenses $L_1$ of tolerable thickness. The loss of focal length and angular dispersion is compensated by passing the light through axially aligned pairs of mirrors $E_1$ and $M_1$ to increase the divergence of the beams to the desired solid angle.

Figure 3:
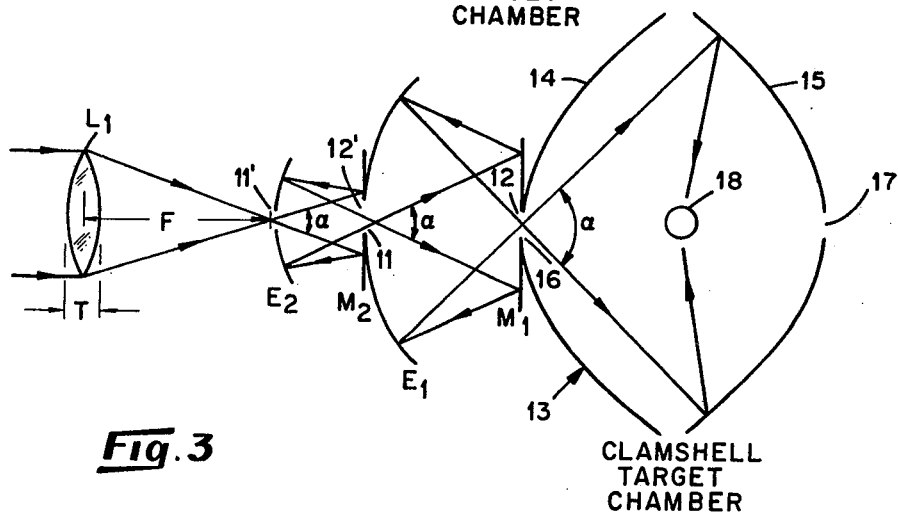

While one set of pairs of mirrors $E_1$ and $M_1$ are sufficient for certain application, additional sets of mirror pairs may be employed as shown in FIG. 3, wherein components similar to those of the Figure embodiment are given corresponding reference numerals. The addition is the provision of a pair of ellipsoidal mirrors or reflectors $E_2$ (only one shown) having an aperture 11' therein and a pair of plane mirrors $M_2$ (only one shown) having an aperture 12' therein. Mirror $M_2$ is positioned adjacent mirror $E_1$ with apertures 12' and 11, respectively, in alignment while mirror $E_2$ is positioned such that the focal point of lens $L_1$ is a aperture 11' and the focal point of mirror $E_2$ is at aperture 11 in mirror $E_1$ as shown, such that light beam 10 passing through lens $L_1$ is reflected and directed onto target 18 in chamber 13 as indicated by the arrows in FIG. 3.

Figure 4:
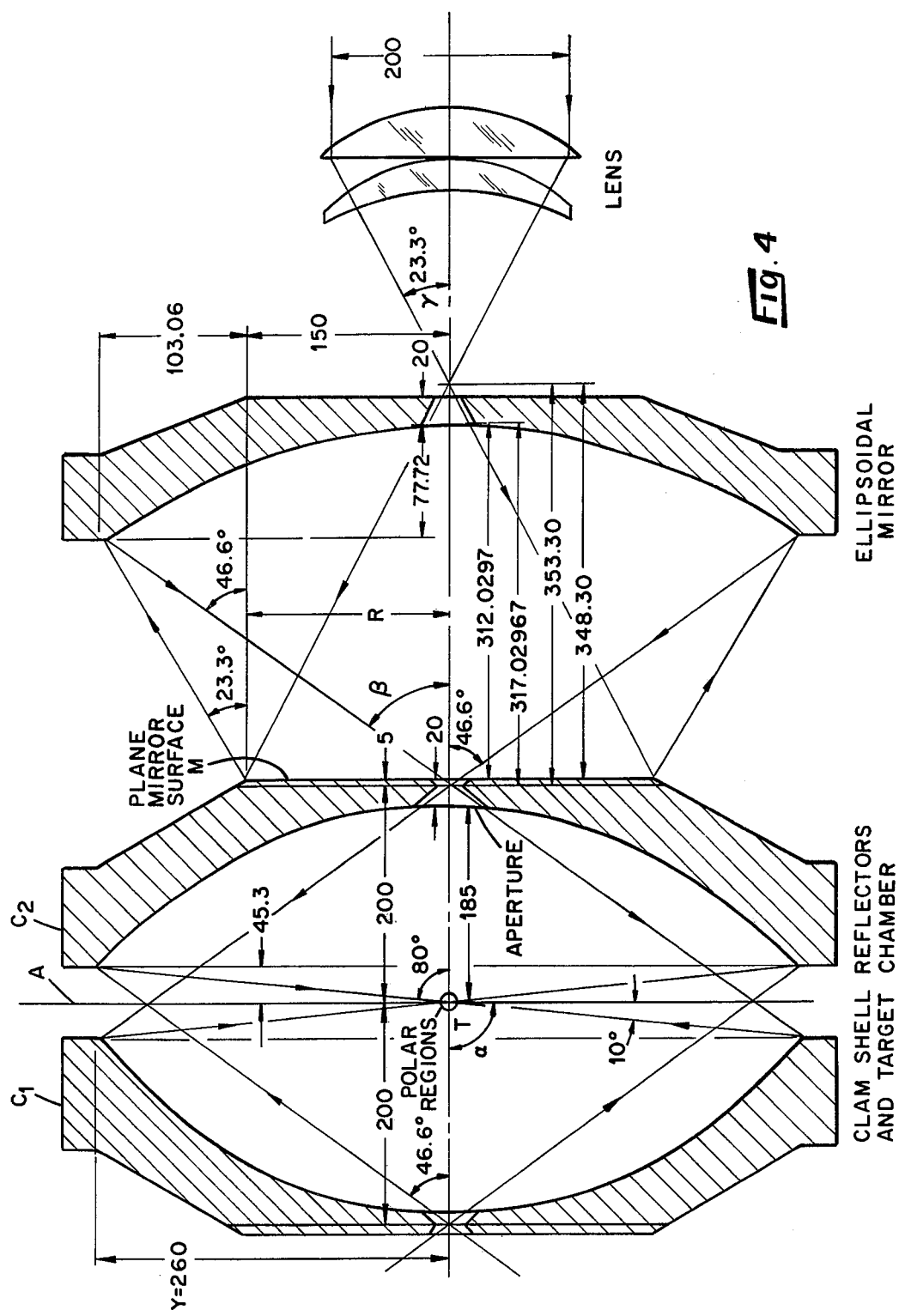
FIG. 4 is a cross-sectional view of one side of a two beam optical system made in accordance with the invention.

FIG. 4 illustrates an actual embodiment constructed in accordance with the invention based on the FIG. 2 embodiment with numerical distance values given thereon being in millimeters to exemplify the invention in greater detail. However, certain important details deserve mention. To provide access to the target area T, the clamshell reflectors $C_1$ and $C_2$ are somewhat spaced apart, providing a limited annular region A. The width of this space is limited by a consideration derived from plasma physics, namely that the angle of incidence of the light upon the target may not deviate from normal by more than about 10° to 15°. This consideration in turn fixes angles $\alpha$, $\beta$, and $\gamma$ in the system. A second limiting consideration is the energy density of the light incident upon plane mirror M which requires that this mirror be above a certain minimum radius R to avoid damage. These parameters then uniquely define the positioning of the lens and refractive elements. Finally, it should be mentioned that this system, either the clamshell reflector surfaces or the refracting surface, will be torically modified to increase illumination at the axial pole regions of the target. This is necessary to compensate for loss of illumination caused by the presence of the apertures through the reflecting surface.

The optical system of this invention offers several advantages. For example, the FIG. 2–4 embodiments compared to the prior art system of FIG. 1 replaces an $f/0.47$ lens with an $f/1.1$ lens. It reduces lens thickness by better than a factor of 2. It can be cascaded if necessary, by the introduction of more ellipsoid-plane mirror pairs. The optical loading of every reflecting surface is less than that on the lens surface. No off-axis optics is used, resulting in better symmetry and uniformity of illumination. Each optical element is, in itself, a focusing element, so that each element can be easily tested by itself. (The plane mirror is a special case, focusing at infinity, but is easily tested.) Each successive stage in the cascade is easier to fabricate, since the ellipsoids become successively shallower. Although not an aplanatic system, the optical system is free of spherical aberration (assuming a single aspheric surface on the lens).

Figure 5:
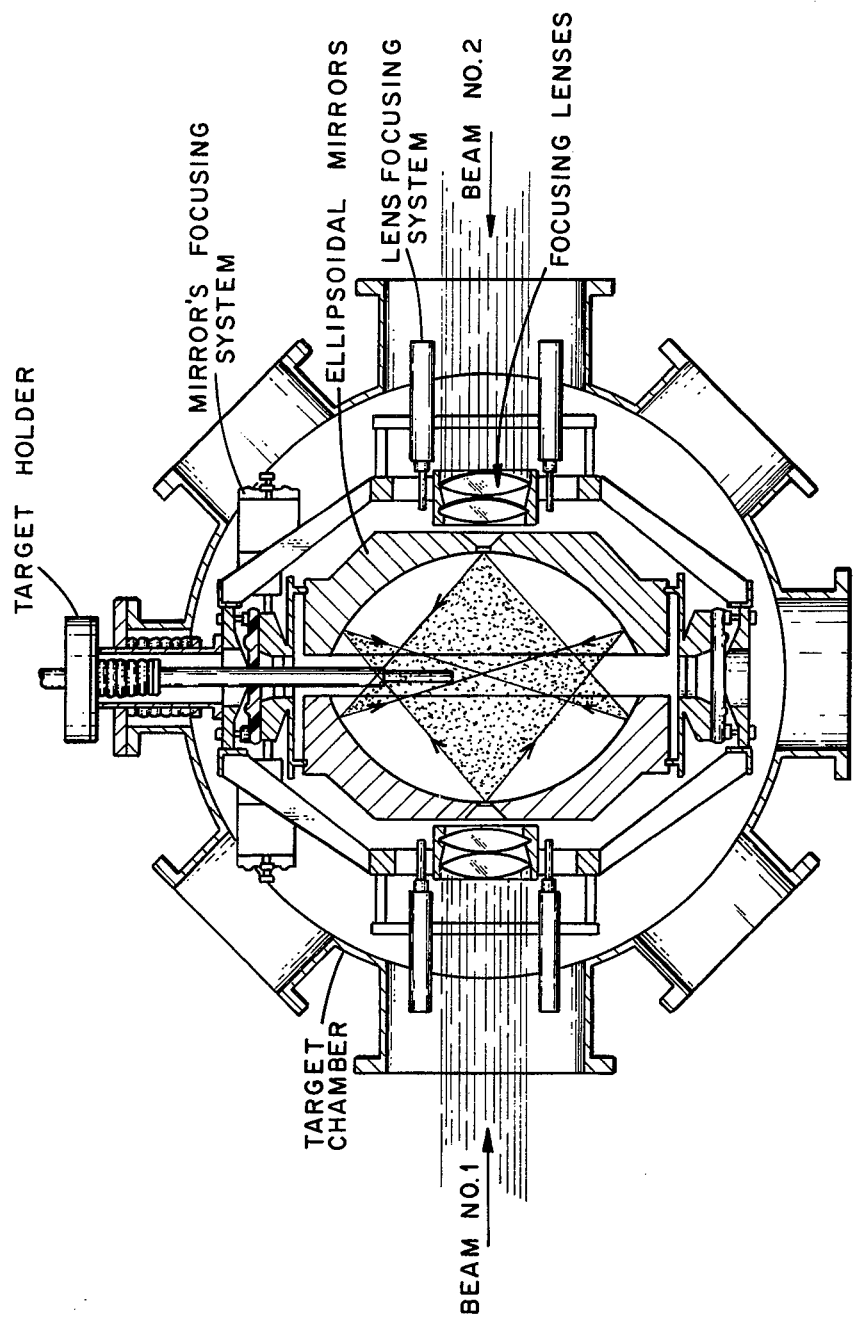
FIGS. 5 and 6 illustrate multi-beam spherical illumination systems for laser-fuel targets incorporating the angle amplifying optics of the invention.
Figure 6:
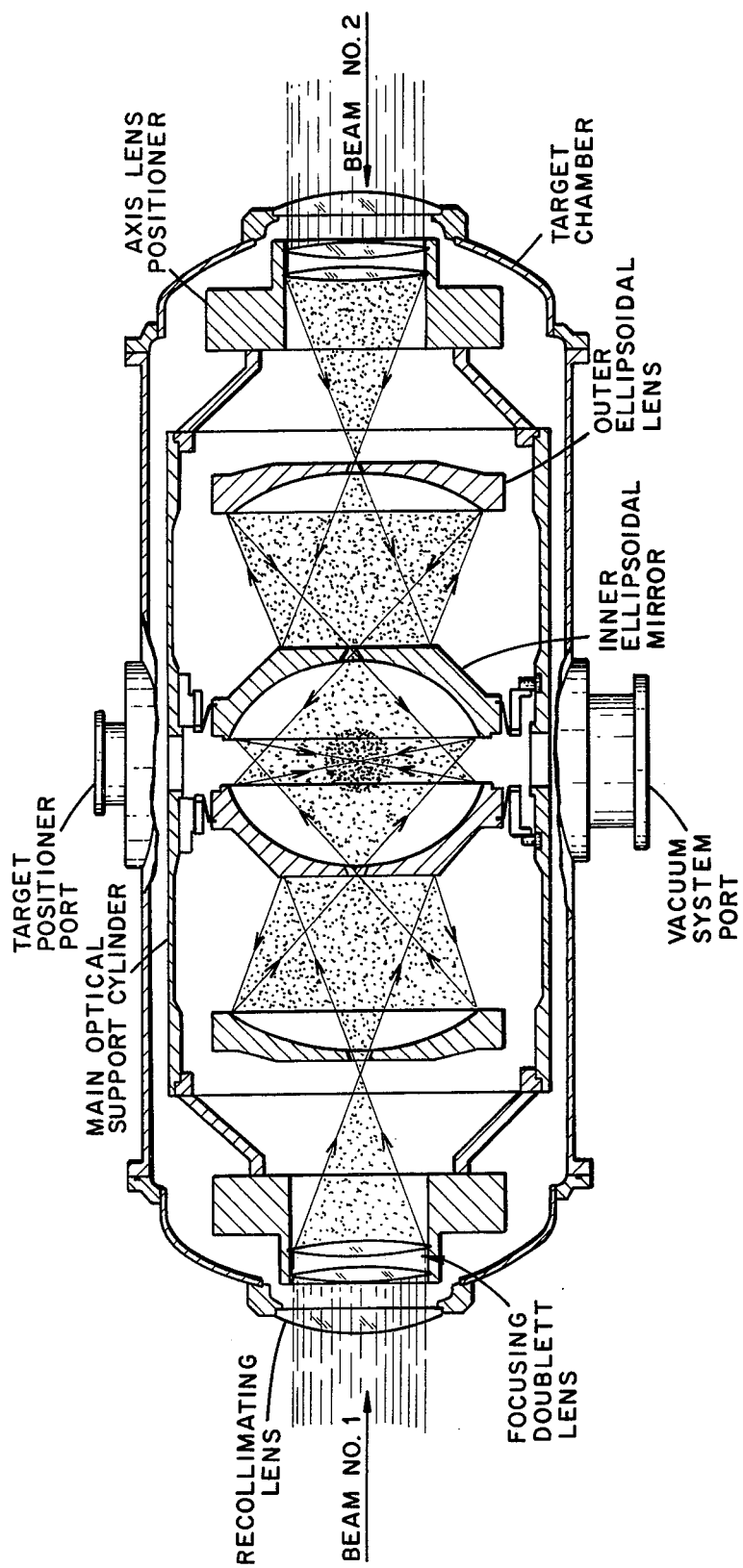

FIG. 5 illustrates a two beam spherical illumination system for use with a laser system called Janus, while FIG. 6 illustrates another two beam spherical illumination system for use with a laser system called Argus, each of which were developed by the University of California, Lawrence Livermore Laboratory, for the laser fusion controlled thermonuclear reactor program, and which incorporate the angle amplifying optics of the present invention and the advantages thereof as set forth above. Note that in these embodiments each of the lens assemblies include two separate lenses.

It has thus been shown that the present invention provides an optical system for providing a wide angle input beam into ellipsoidal target illumination systems and overcomes the problems of the prior known systems using refractive optics by utilizing only relatively thin lenses of modest focal lengths and pairs of plane and ellipsoidal mirrors to provide the necessary angular divergence of the beam.

While the invention has been described with respect to a two beam system, it can be utilized with multiple beam systems by modification of the clamshell target chamber and incorporation of the necessary plane-ellipsoid mirror pairs thereinto.

While particular embodiments and parameters have been described or illustrated, modifications will become apparent to those skilled in the art, and it is intended to cover in the appended claims all such modifications as come within the spirit and scope of the invention.

What I claim is:

1. An optical system for providing wide angle input beams into ellipsoidal target illumination systems comprising: a pair of ellipsoidal reflectors positioned to define a clamshell configured target chamber, each of said reflectors having apertures therein, a pair of lens assemblies positioned on opposite sides of said target chamber and aligned with said apertures of said reflectors, at least one pair of plane mirrors having apertures therein positioned on opposite sides of said target chamber intermediate said reflectors and said lens assemblies with said apertures being aligned with said apertures of said reflectors, and at least one pair of ellipsoidal mirrors having apertures therein positioned on opposite sides of said target chamber intermediate said reflectors and said lens assemblies with said apertures being aligned with said apertures of said reflectors, each of said ellipsoidal mirrors being positioned with respect to one of said plane mirrors such that said one plane mirror is adjacent a concave surface of said ellipsoidal mirror.

2. The optical system defined in claim 1, wherein said one pair of plane mirrors is mounted on said pair of reflectors.

3. The optical system defined in claim 1, wherein said pair of ellipsoidal mirrors is positioned such that the apertures therein are at the focal points of said lens assemblies, and wherein said pair of ellipsoidal mirrors is positioned with respect to said reflectors such that the apertures of said reflectors are at the focal points of said pair of ellipsoidal mirrors.

4. The optical system defined in claim 1, wherein said pair of lens assemblies each comprises a pair of spaced lenses.

5. The optical system defined in claim 1, wherein two pair of plane mirrors are positioned in spaced relation intermediate said reflectors and said lens assemblies, and wherein two pair of ellipsoidal mirrors are positioned such that one pair is located intermediate two of said plane mirrors and the other pair is located intermediate said lens assemblies and one of said pairs of plane mirrors such that light passing through said pair of lens assemblies passes sequentially through apertures in one pair of said ellipsoidal mirrors, one pair of said plane mirrors, another pair of said ellipsoidal mirrors, another pair of plane mirrors, and through said apertures in said reflectors into said target chamber for illuminating a target located therein.

* * * * *